March 30, 1965 J. J. WRIGHT 3,176,134
GAMMA DENSITOMETER FOR TESTING RAILROAD TIES
Filed Nov. 23, 1960 6 Sheets-Sheet 1

INVENTOR.
JAMES J. WRIGHT
BY Bosworth, Sessions
Herrstrom & Knowles
ATTORNEYS.

March 30, 1965  J. J. WRIGHT  3,176,134
GAMMA DENSITOMETER FOR TESTING RAILROAD TIES
Filed Nov. 23, 1960  6 Sheets-Sheet 2
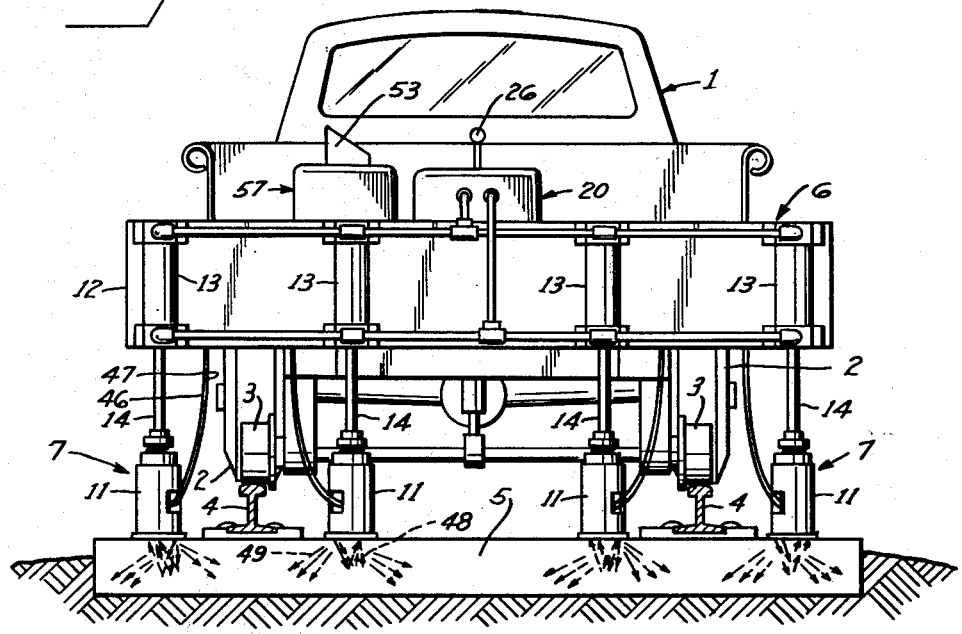
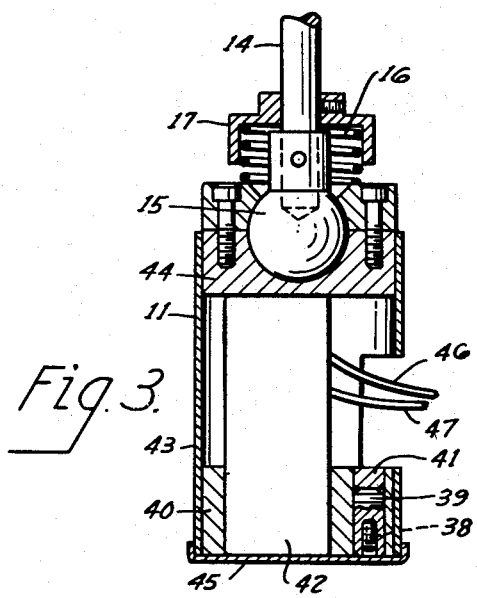
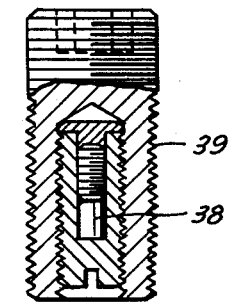
INVENTOR.
JAMES J. WRIGHT
BY Bosworth, Sessions
Herrstrom & Knowles
ATTORNEYS.

March 30, 1965    J. J. WRIGHT    3,176,134
GAMMA DENSITOMETER FOR TESTING RAILROAD TIES
Filed Nov. 23, 1960    6 Sheets-Sheet 3
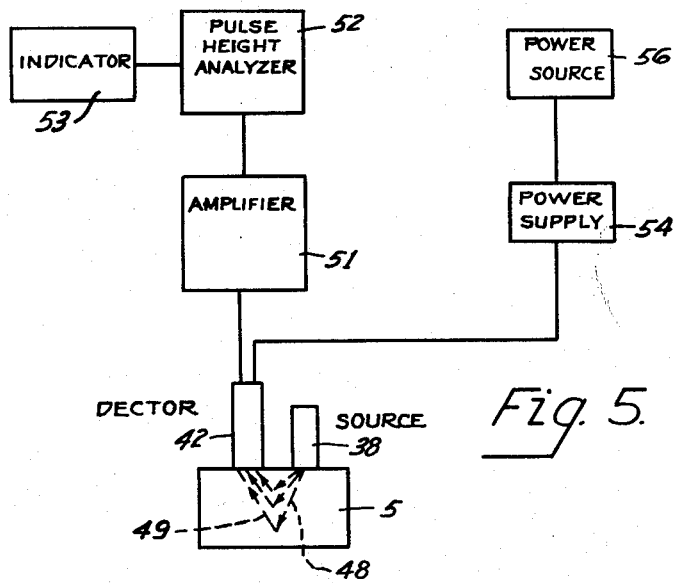
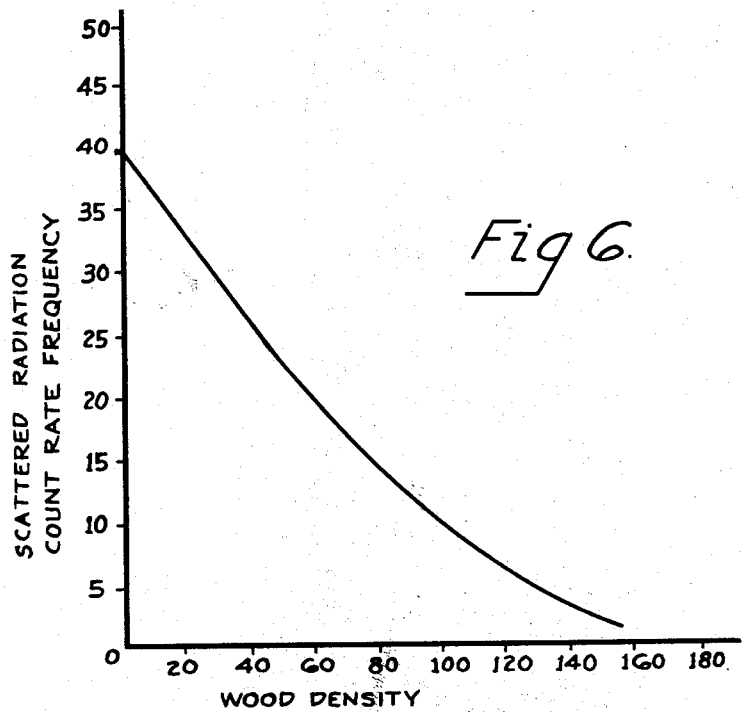
INVENTOR.
JAMES J. WRIGHT March 30, 1965     J. J. WRIGHT     3,176,134

GAMMA DENSITOMETER FOR TESTING RAILROAD TIES

Filed Nov. 23, 1960     6 Sheets-Sheet 4

INVENTOR.
JAMES J. WRIGHT
BY Bosworth, Sessions
Herrstrom & Knowles
ATTORNEYS.

March 30, 1965 J. J. WRIGHT 3,176,134
GAMMA DENSITOMETER FOR TESTING RAILROAD TIES
Filed Nov. 23, 1960 6 Sheets-Sheet 5

INVENTOR.
JAMES J. WRIGHT
BY Bosworth, Sessions
Herrstrom & Knowles
ATTORNEYS.

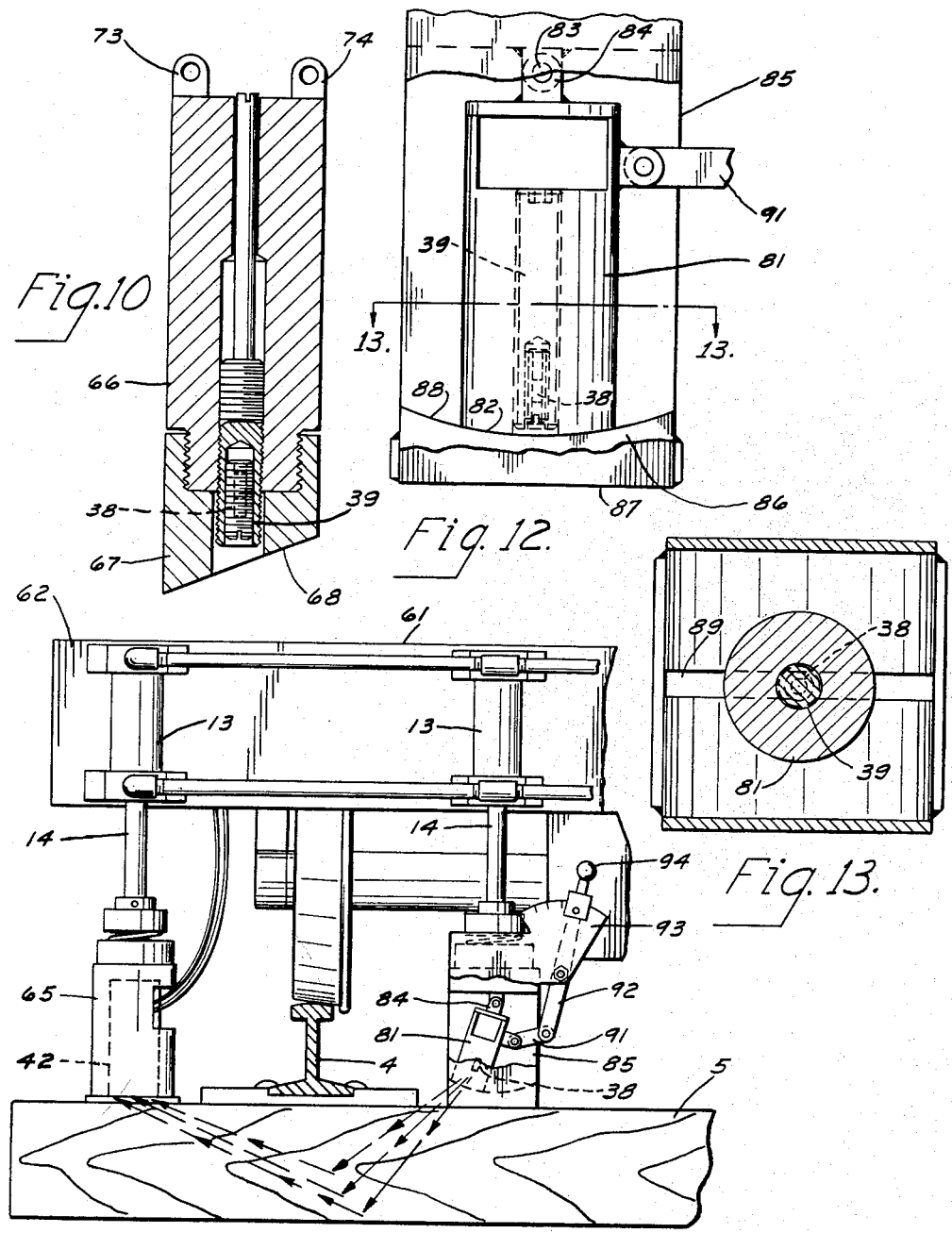

United States Patent Office 3,176,134
Patented Mar. 30, 1965

3,176,134
GAMMA DENSITOMETER FOR TESTING
RAILROAD TIES
James J. Wright, Bratenahl, Cleveland, Ohio, assignor to Cleveland Technical Center, Inc., Cleveland, Ohio, a corporation of Delaware
Filed Nov. 23, 1960, Ser. No. 71,188
17 Claims. (Cl. 250—83.3)

This invention relates to apparatus for the determination of the structural soundness of wood parts, and more particularly to apparatus for rapidly and dependably testing the density of wood parts to determine their structural soundness, by the use of gamma rays without cutting or otherwise damaging the parts.

While the invention may be used for various purposes, it will be described in connection with the testing of railroad ties to determine the soundness of their internal structure, to determine whether they are sound or unsound because of decay or other causes. The invention provides exceptionally great advantages when used for this purpose, because of the great importance and magnitude of the problem it solves, and the great economic savings it makes possible.

It is important for safety and other reasons that railroad cross ties used in a track be sound structurally. Despite various precautions such as chemical impregnation, railroad ties still deteriorate in time due to decay and other causes. The time during which deterioration occurs to the degree where the tie is unusable depends on many variables, such as the material, quality and seasoning of the wood, the impregnant used, and the quality or degree of impregnation, amount of traffic on the tracks, track bed drainage, local climatic conditions, and other factors. Although rigid visual and mechanical sounding inspection procedures are generally followed, it is difficult by such inspection procedures to determine adequately the condition of the ties. The major reason is that the bottom and substantially all of the sides of the tie are buried in the track ballast and the top only is visible, so that only a minor portion of the exterior surface of the tie is available for inspection. Furthermore, inspection based on visual examination or mechanical sounding of the exterior often does not give sufficiently accurate information as to the condition of the interior of the tie. Consequently, it is the practice periodically to remove each tie and replace it with a new tie. In general, carefully worked out replacement schedules are followed, which vary from area to area depending on the factors described above as effecting tie life. In general, the ties are replaced over periods ranging from about two to about twenty years, with an average estimated tie life of about seven years. Even this practice, however, does not insure that unsound ties are removed early enough, or that sound ties are not removed even though they have several years of useful life.

The magnitude of the problem can be further appreciated from the fact that there are about 3,000 ties per mile of track, so that a railroad system having several thousand miles of track has millions of ties subject to replacement. Since it costs several dollars to replace each tie, annual costs for tie replacement are exceedingly large. It is estimated that American railroads spend over $100,000,000 per year for the upkeep and replacement of over a billion ties. If tie replacement can be carried out only when necessary, so that a tie is removed and replaced with a new tie only when the old tie is unsound, very great savings obviously can result. Prior to the present invention, so far as I know, this problem has never been satisfactorily solved.

It is an object of the present invention to provide apparatus which will permit rapid and dependable determination of the structural soundness of the interior of railroad ties or other wood parts from one surface only, without requiring removal of the tie or cutting or otherwise damaging it. It is another object of the invention to provide a wheeled vehicle, adapted to travel on railroad tracks, which will make such determination. Another object is the provision of such apparatus embodying means for emitting gamma rays into the tie, and measuring the gamma rays scattered from the interior of the tie to determine the density of the tie and hence its structural condition. A further object is the provision of such apparatus which is simple to operate and which provides readily understandable means.

These and other objects and advantages of the invention will become apparent from the following description of several preferred forms of apparatus, reference being made to the accompanying drawings in which:

FIGURE 2 is a rear elevation of the apparatus of FIGURE 1, showing the gamma ray emitting and detecting equipment;

FIGURE 3 is a sectional elevation to an enlarged scale, of one of the units for emitting and detecting gamma rays;

FIGURE 4 is a sectional elevation to a still larger scale of a preferred gamma ray radiation source;

FIGURE 5 is a diagrammatic representation of the means used in the apparatus of FIGURE 1 for emitting gamma rays, detecting gamma rays back-scattered from the interior of the material being tested, and measuring the back-scattered rays to determine the density and hence the structural soundness of the material being tested;

FIGURE 6 is a curve showing the relationship of the density of the material being tested to the measurement of the back-scattered gamma radiation;

FIGURE 10 is an enlarged sectional elevation of the radiation source holder employed in the apparatus of FIGURE 9;

FIGURE 11 is an elevation, generally corresponding to that of FIGURE 9, of a portion of another embodiment of the invention, constituting an end of a vehicle similar to that shown in FIGURE 8, and comprising another form of equipment for emitting gamma rays and measuring gamma rays scattered from a tie being inspected;

FIGURE 12 is an enlarged side elevation, with parts broken away, of the adjustable holder carrying the gamma ray source and embodied in the apparatus of FIGURE 11; and FIGURE 13 is a sectional elevation along line 13—13 of FIGURE 12.

Figure 1:
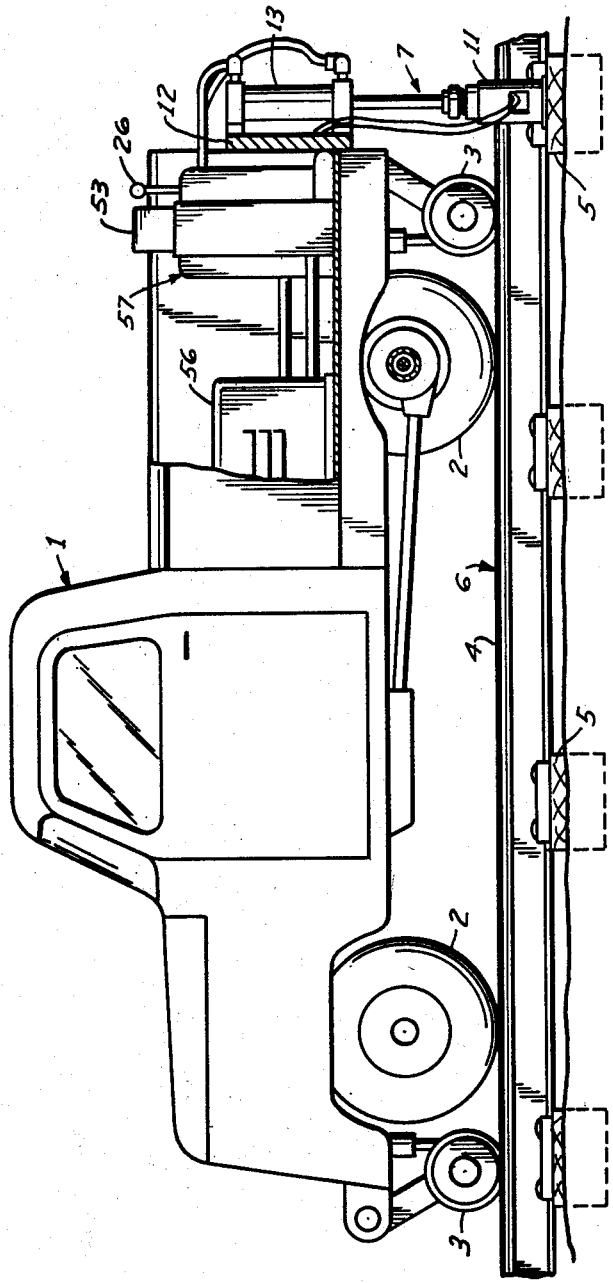
FIGURE 1 is a side elevation of one type of wheeled vehicle embodying the invention, taking the form of an automatic truck type vehicle adapted to travel on railroad tracks as well as over the road and having tie inspecting equipment located at its rear portion, parts being broken away to show such equipment more clearly.

The apparatus of FIGURES 1 to 7, inclusive, comprises a commercially available motor truck vehicle 1 equipped with standard rubber-tired wheels 2, at least the rear wheels of which are power driven, and auxiliary flanged wheels 3 which may be lowered to act as guide wheels to permit the vehicle to travel on the rails 4 supported on ties 5 to form a railroad track generally indicated by reference numeral 6. These flanged wheels may be raised to permit the vehicle to be used for off-track driving in the usual manner. The rear portion of the vehicle supports the inspection equipment, generally indicated by reference numeral 7, which determines the soundness of a tie by the measurement of gamma radiation back-scattered from the interior of the tie.

In each of the illustrated forms of apparatus, the inspection equipment determines the soundness of the internal structure of a railroad tie by exposing an area of the top of the tie to direct radiation of gamma rays from a suitable source located immediately above the tie, and measuring the gamma radiation scattered from the interior of the tie by a suitable detector located immediately above the tie and shielded or otherwise protected from the direct radiation emanating from the source. Preferably, a radiation source and its associated detector are closely positioned adjacent the portion of the tie located in close proximity to each rail, to determine the soundness of the tie in the vicinity of the rail, since there is a greater tendency for decay in this portion of the tie due to the penetration of the hold-down spikes for the rail.

In the apparatus of FIGURES 1 to 7 inclusive, and as shown advantageously in FIGURE 2, the inspection equipment 7 comprises four inspection units 11, each containing a radiation source and a radiation detector, which are supported from a frame member 12 mounted at the rear of the vehicle 1. Preferably, the apparatus is designed so that as the vehicle travels, the inspection units 11 are lowered into contact with the top of each tie 5 so that a reading can be taken, and then raised until the next tie is reached, where they are again lowered, and so on. Preferably, the units 11 are lowered and raised substantially in unison.

The means shown for lowering and raising the units comprises a hydraulic cylinder 13 for each unit 11; this cylinder is rigidly mounted on the frame member 12 in a position so that the unit carried by its piston rod contacts each tie 5 in the proper position adjacent one of the rails 4. Each cylinder has a piston rod 14 to the lower end of which a unit 11 is connected, preferably by a connection permitting the unit to move angularly to a certain extent in any direction relatively to the piston rod to permit it to adjust to irregularities on the upper surface of the tie contacted by the unit. For this purpose, as shown in FIGURE 3 of this embodiment, the unit 11 is mounted on the end of its piston rod 14 by a ball and socket joint 15. Preferably, an expansion spring 16 is provided to bear against top of unit 11 and against a cap 17 fixed to the piston rod, to resiliently bias the unit to a position where its axis coincides with that of the piston rod, while permitting the unit to move angularly and resiliently to other position to compensate for irregularities in the surface of tie 5.

Figure 7:
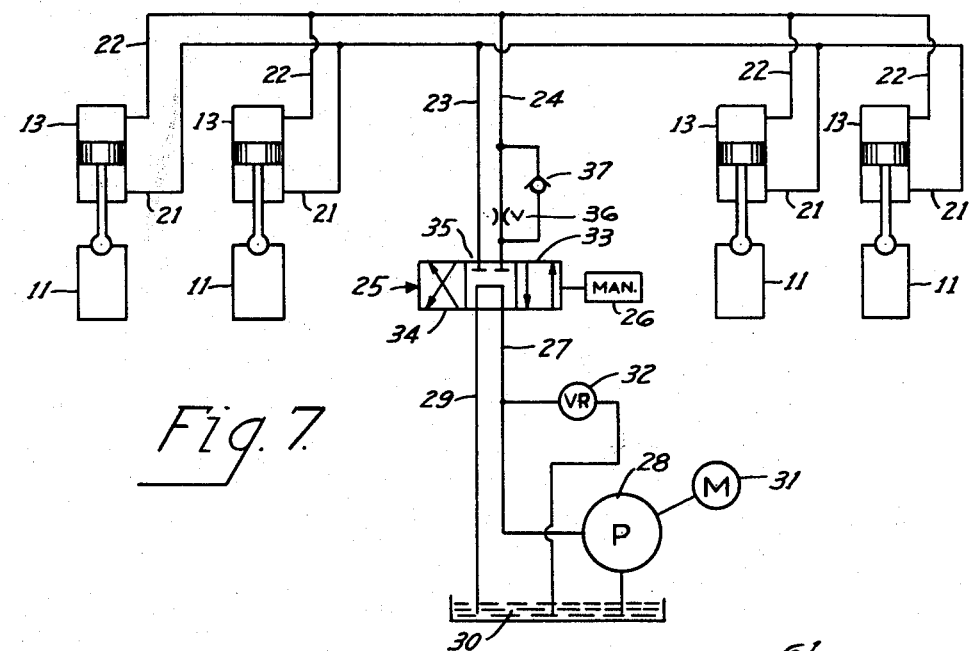
FIGURE 7 is a diagram of the hydraulic system used in the apparatus of FIGURE 1 for raising and lowering the units for emitting and detecting gamma radiation.

The hydraulic cylinders 13 are caused to lower and raise all the units 11 in substantial unison by the hydraulic system generally indicated at 20 in FIGURE 2, and diagrammatically shown in FIGURE 7. In this system each hydraulic cylinder 13 has a conduit 21 connected to its piston rod end and a conduit 22 connected to its other end; conduits 21 and 22 for all cylinders are respectively connected to the main supply lines 23 and 24. A control valve 25, manually controlled by handle 26, is provided to connect each of lines 23 and 24 to, or disconnect it from, a line 27 connected to a pump 28 and a line 29 connected to a sump 30. Pump 28 is driven by an electric motor diagrammatically shown at 31. Preferably, a release valve 32 is provided in the line 27 between the sump 30 and control valve 25. Control valve 25 may be of any conventional three-position type, having a first position, indicated by reference numeral 33, in which the pump line 27 is connected to line 24 and sump line 29 is connected to line 23, to move the piston rods 14 downwardly to lower the units 11; a second position, indicated by numeral 34, in which the pump line 27 is connected to line 23 and sump line 29 is connected to line 24, to move the piston rods 14 upwardly and thus raise the units 11; and a third position, indicated by reference numeral 35 in which both lines 23 and 24 are blocked and the pump line 27 is connected to sump line 29, so that the piston rods 14 and their associated units 11 are held in whatever position they are located when the control valve is moved to position 35. Preferably, there is a throttle valve 36 in line 24 and a check valve 37 by-passing valve 36 so that the piston rods 14 cannot be lowered so rapidly as to cause the units 11 to strike the tie with sufficient force to damage the units, while permitting them to be rapidly raised. While a manually controlled hydraulic system is shown, it is apparent that suitable means can be provided for automatically raising and lowering the inspection units 11 as required.

The inspection system employing gamma rays, forming part of the apparatus of FIGURES 1 to 7 inclusive, is shown in FIGURES 2, 3 and 4 and diagrammatically in FIGURE 5. A suitable source of gamma rays, such as a capsule 38 shown in FIGURES 3 and 4, is secured in a stud 39 formed of steel or similar metal; this stud is threaded into a thick body 40 formed of a shielding metal such as lead or an alloy of tungsten, copper and nickel, located in the bottom of unit 11. Preferably, the top of the stud is covered with a cap or plug 41 of shielding metal. Metal body 40 also supports a suitable detector 42, and shields it against direct radiation from the source 38.

The source 38, the detector 42, and body of shielding metal 40 are supported at the bottom of a housing 43 formed of suitable metal such as aluminum. The top of the housing is fixed to a member 44 forming part of the ball and socket connection 15; the bottom of the housing has a wall 45 formed of a metal transparent to gamma radiation, such as aluminum, which serves to aid in supporting the source, the detector, and shielding body 40, and which provides a bottom surface adapted to bear against the tie being inspected. The design is such that when the unit 11 is in contact with the top of the tie being inspected, the source 38 and detector 42 are close to the top surface of the tie and the spaces between such surface and the source and the detector are substantially filled by metal substantially transparent to gamma radiation. This construction greatly reduces or substantially eliminates radiation through air which, unless otherwise prevented, constitutes a major proportion of the scattered radiation and tends to obscure or mask the count of the desired radiation scattered from the interior of tie material. The effectiveness of the apparatus is thus greatly increased. Each unit 11 also embodies the wires 46 and 47 connecting the detector to the remainder of the system.

The system employed in this and the other described embodiments of the invention utilizes the Compton scattering of gamma rays to determine the denisty and hence the soundness of the structure of the wood of the tie being inspected. In Compton scattering, when gamma rays pass into a medium containing electrons, collisions of the rays with the electrons cause the gamma rays to scatter, with diminished energy and momentum. The distribution of these scattered gamma rays is such that they predominate in the forward and backward directions relatively to the incident rays. Moreover, for an incident gamma ray of given energy, the energy of the scattered gamma ray is a function of the angle at which the scattered ray travels relatively to the incident ray. The number of scattered gamma rays is a function of the electron density of the material penetrated by the incident rays. Thus, for incident gamma radiation of a given energy penetrating a material of given electron density, the gamma rays scattered in a backward direction will lie in a certain energy band, and the gamma rays scattered in a forward direction will lie in another energy band. Moreover, in order to develop Compton scattering usable for the purposes of this invention, the gamma ray source preferably should emit substantial radiation having energies below 1.02 m.e.v., since gamma rays of higher energies tend to produce electron-positron pairs. Preferably, the scattered radiation, whether back-scattered or forward scattered radiation, utilized in the present invention is that scattered at angles fairly close to the direction of incident radiation, such in the range of from about −30° to about +30° from the direction of incident radiation.

For a material composed of a given combination of elements, the intensity of the Compton scattered gamma rays is a function of the density of the material. It has been found that the wood in railroad ties is sufficiently homogeneous in chemical composition so its electron density is a function of the density of the structure of the tie, and that the soundness of the structure of the tie, upon which its serviceability depends, is a function of its structural density.

These factors are utilized in the system diagrammatically illustrated in FIGURE 5 and employed in the apparatus of FIGURES 1 to 7 inclusive, to ascertain rapidly and dependably the structural soundness of the portion of the railroad tie subjected to gamma radiation. The source 38 emits gamma radiation indicated by the broken lines 48 into a selected portion of the tie 5. The electrons of the tie cause back-scattered gamma radiation indicated by broken lines 49. A portion of the back-scattered radiation strikes the detector 42. While various sources of gamma radiation may be employed, that found exceptionally desirable is about 150 to about 250, and preferably about 200, microcuries of cesium 137. Cesium 137 emits gamma radiation having energies below 1.02 m.e.v. but sufficiently strong to penetrate deeply into the wood of the cross tie and produce scattered gamma radiation having sufficient energies to be detectable for use in determining density of the wood structure, but not so strong that it can penetrate entirely through the tie and hence cause inaccurate readings due to back-scattering from the ballast or road bed material, or constitute a hazard to personnel; its half life of about 30 years permits long and economic usage without need for replacement. An amount in the range about 150 to 200 microcuries provides an intensity of radiation field which results in a statistically satisfactory count rate of scattered radiation while not requiring excessive shielding. The detector 42 preferably employed is a typical scintillation crystal of sodium iodide mounted in a conventional manner on a photo-multiplier tube, not shown, which transforms into electrical impulses the fluorescent light emitted by the crystal in response to the scattered gamma radiation impinging on the crystal; however, other types of detectors may be employed, such as those of the Geiger-Müller counter tube type or solid state devices, particularly when higher radiation levels are utilized.

The impulses from the detector pass to a suitable amplifier 51; the amplified impulses then pass to a suitable commercially available pulse height analyzer 52, which feeds into a suitable indicating device 53. The detector is supplied with electrical power from a suitable high voltage power supply 54, required low voltage power being supplied to the amplifier, pulse height analyzer, and indicator from a suitable source, not shown. Both power supplies receive their electrical energies from a suitable power source 56. In the apparatus illustrated in FIGURES 1 to 4 inclusive, the power source 56 may be an electrical generator driven by an internal combustion engine, and the amplifier and indicator are embodied in a unit generally indicated by reference numeral 57.

In the apparatus illustrated in FIGURES 1 to 7 inclusive, and embodying the system diagrammatically shown in FIGURE 5, each radiation source 38 and its detector 42 are so geometrically located relatively to each other and are adapted to be brought into proximity with the top surface of the tie in such manner that the incident gamma radiation from the source penetrates deeply into the tie and causes substantial back scattering in directions from about −30° to about +30° to the direction of incident radiation. The pulse height analyzer 52 is adjusted so it selects for counting and transmits to the indicator 53 signals relating only to the pulses transmitted from the photo-multiplier tube of the detector which have originated from gamma rays back-scattered in this range. The sensitivity of the equipment is thus greatly increased, as is its effectiveness in determining the density of the tie structure.

In general, the sound wood structure is denser and hence develops a higher intensity of back-scattered gamma radiation than the structure whose interior is porous or has cavities therein due to decay or other reasons. The indicating device 53 may be of any suitable type to provide the necessary information as to soundness of structure. Thus, it may merely register "good" or "bad" with or without other visual indication, it may even actuate a marking device to mark the unsound ties; or it may be of the well-known count rate meter type suitably calibrated.

FIGURE 6 is a curve showing wood density of a railroad tie plotted against intensity of back-scattered gamma radiation, the units of wood density being cubic inches of void as caused either by porosity or cavities due to decay, while the gamma ray intensity is plotted in count rate frequency indicated by meter readings. It will be noted that the differences in wood density due to porosity or cavities are reflected as very substantial differences in meter readings of back-scattered gamma ray intensity.

In the embodiment just described, a radiation source and a detector are mounted in each unit 11, and there is a pulse height analyzer and indicator for each unit; the power source and the power supplies may of course be common to all units. There are four units, two being disposed to contact the tie 5 in close proximity to each rail 4 since as was indicated above deterioration of the tie tends most likely to occur in the vicinity of the rail due to the spikes or fastening means. The units operate on the principle of measuring back-scattered gamma radiation, and all are raised and lowered in substantial unison by the hydraulic system as the vehicle travels along the tracks.

Figure 9:
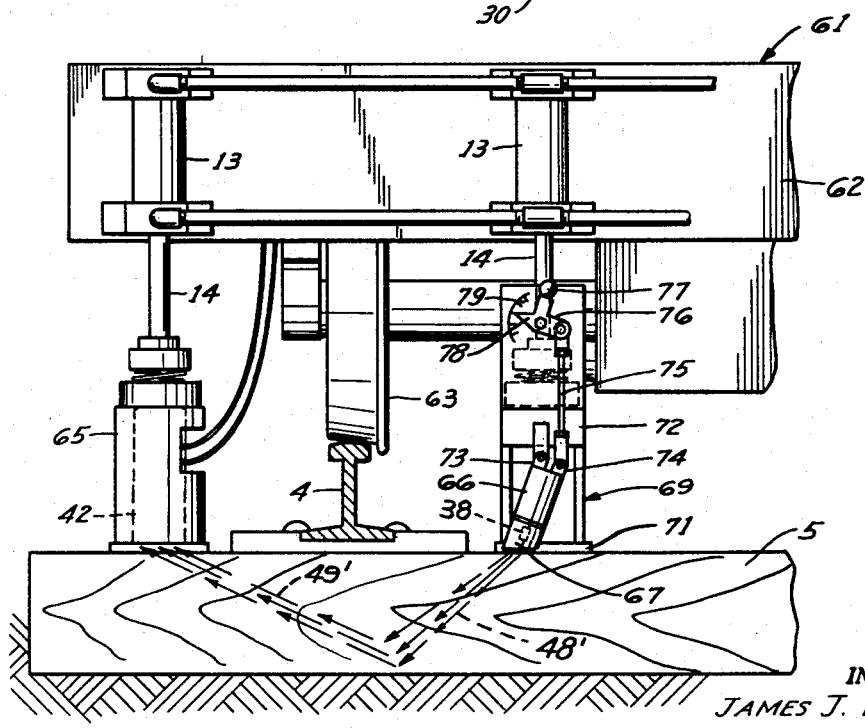
FIGURE 9 is an elevation of a portion of an end of the vehicle of FIGURE 8, showing a modified form of equipment for emitting gamma rays and measuring gamma rays scattered from the interior of a railroad tie to determine the soundness of its structure, in which equipment a source of gamma rays is adapted to be adjustably inclined relatively to the tie being inspected.
Figure 8:
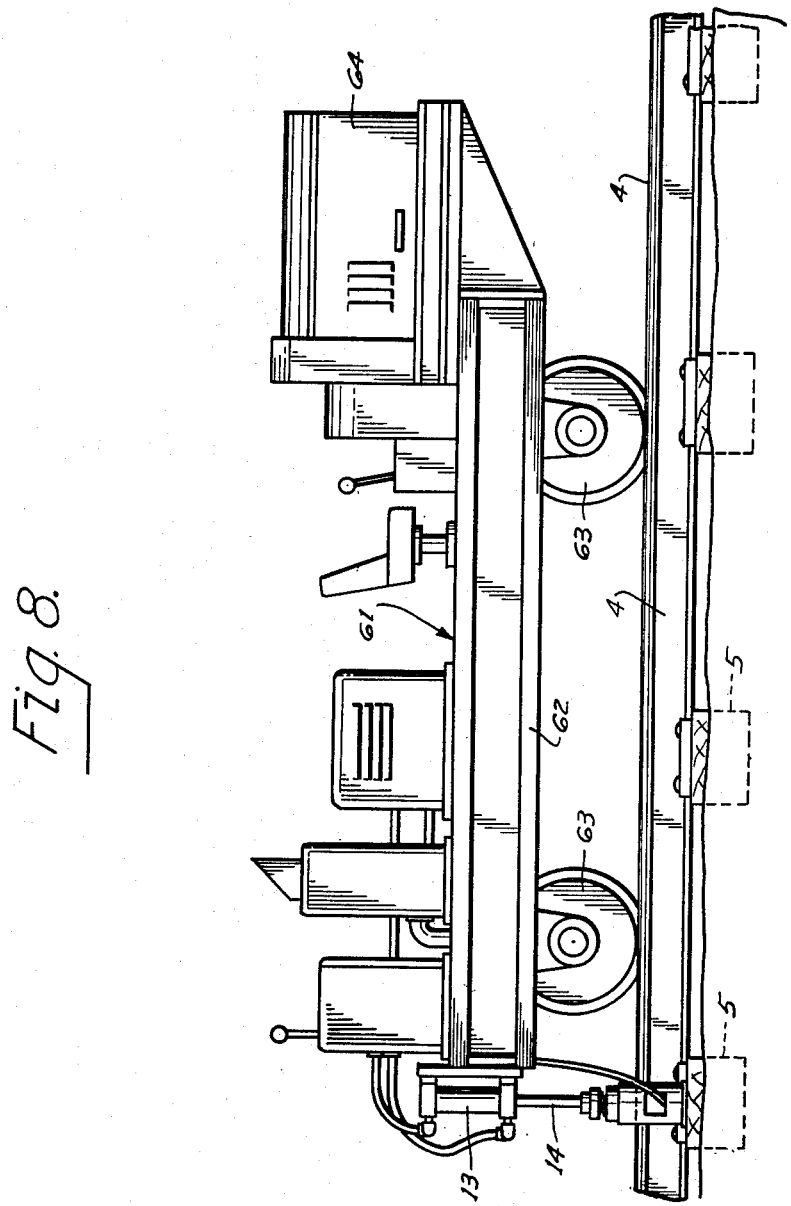
FIGURE 8 is a side elevation of another form of wheeled vehicle for determining the structural condition of the ties, taking the form of a test car adapted to travel on railroad tracks.

The embodiment of FIGURES 8 to 10 inclusive, comprises a different type of vehicle and a system of inspection based on measurement of forward-scattered gamma radiation. More specifically, the vehicle of this embodiment is a small car 61 designed to travel only on a railroad track. The car comprises a frame 62, supported on flanged wheels 63 adapted to travel on the rails 4, the car being driven by an internal combustion power plant 64. The rear portion of the frame of this car supports four hydraulic cylinders 13 similar to those of the previous embodiment. Each of these cylinders has a piston rod 14, all of which rods are adapted to be lowered and raised in unison by hydraulic system similar to that previously described. In this appaartus, however, as is shown in FIGURE 9, a source of radiation 38 and a detector 42 of scattered gamma radiation are located on opposite sides of a rail 4, and the gamma radiation scattered from the interior of the tie 5 and measured by the detector is forward-scattered gamma radiation. The detector 42 in this embodiment is identical to that previously described, except that it is mounted in a housing 65 connected to the piston rod 14 of the hydraulic cylinder 13 located outside of the rail 4. The housing 65 is similar to the housing 43 of the first embodiment, modified as required to support only the detector, and is similarly connected to the piston rod by a resiliently biased ball and socket joint.

In this embodiment, as is shown in FIGURES 9 and 10, each radiaiton source is mounted so that it may be disposed at an angle to the tie 5 which angle may be adjusted to cause forward scattering which will be most effectively detected by the detector to indicate the density and hence the structural soundness of the portion of the tie beneath the rail 4. The source of radiation 38, which may be a capsule of cesium 137 as in the previous embodiment, is mounted in a stud 39, as shown in FIGURE 10. This stud is threadedly supported in a holder member 66, formed of lead or other suitable shielding material, and preferably having a lower portion 67 formed of shielding material formed with an inclined surface 68 to reduce to a minimum the air gap between the shielding holder member 66 and the top of the tie 5; as was indicated above it is desirable to keep this air gap as small as possible to reduce air scattering of gamma rays which can cause inaccurate readings on the detector system. While various means may be employed to adjustably support the holder member 66 relatively to the tie, that shown comprises a supporting member 69 having a bottom portion 71 adapted to bear against the top of the tie 5 when the member 69 is in the lowermost position, and having a body portion 72 to which the holder member 66 is pivotally connected by one of its top lugs 73. Another lug 74 at the top of the holder member 66 is pivotally connected through a rod 75 to an actuating member 76 pivotally mounted on the body portion 72. The actuating member has a handle 77 by means of which its position may be angularly adjusted to adjust the angle of inclination of holder member 66; preferably the handle is of the type which when twisted will lock the actuating member 76 in place to hold its position. Preferably, the actuating member 76 also is provided with a pointer 78 adapted to cooperate with a scale 79 on body portion 72, so that the angular position of the actuating member and hence of the holder member 66 can be readily indicated and determined. The holder is advantageously adjusted so that the forward-scattered radiation which affects the detector lies primarily in the range from about −30° to about +30° to the incident radiation emitted from the source. The body portion 72 is resiliently mounted on the piston rod 14 of one of the hydraulic cylinders 13, so that the member 69 supporting the radiation source is adapted to be raised and lowered in unison with its associated detector 42 mounted in housing 65, and in unison with the member 69 and housing member 65 in the vicinity of the other rail.

When each radiation source supporting member 69 and its associated detector housing member 65 are lowered into contact with a tie 5, the gamma radiation from the radiation source 38 passes into the tie 5 as indicated by the broken lines 48' and forward-scattered radiation as shown by broken lines 49' strikes the detector 42. The resulting impulses are counted and registered by a system like that of FIGURE 5 to indicate the soundness of the structure of the portion of the tie below and in the vicinity of each rail 4.

FIGURES 11 to 13 inclusive, show parts of an embodiment of the invention which is in all respects identical with that described above in connection with FIGURES 8 to 10 inclusive, except that the means for supporting the radiation source and adjusting its inclination relatively to the tie are different. This embodiment comprises a vehicle 61 adapted to be driven along a track, the vehicle being similar to that shown in FIGURE 8. The rear end of frame 62 of the vehicle supports four hydraulic cylinders 13, each having a piston rod 14, the piston rods being adapted to be raised and lowered in unison by a hydraulic system identical to that described in connection with the embodiments of FIGURES 1 to 7 inclusive, and FIGURES 8 to 10 inclusive. The piston rod 14 of each hydraulic cylinder located on the outside portion of a track 4 resiliently supports a detector housing member 65 in which is supported a detector 42 as previously described in connection with FIGURE 9. The piston rod 14 of each hydraulic cylinder 13 located on the inner side of a track 4 carries a radiation source 38 adapted to emit gamma radiation, the forward-scattered radiation of which is detected by the detector 42 and the impulses of which are amplified, reflected and counted by the circuit means described above in connection with FIGURES 1 to 7, inclusive.

As shown in FIGURES 12 and 13, each radiation source 38 is contained in a stud 39 which is threadedly supported in a holder member 81 preferably formed of a shielding material such as lead. The bottom surface 82 of this holder member is formed as a portion of a cylinder, the axis of which passes through the pivot point 83 of supporting lug 84 fixed to the top of holder member 81. This lug is pivotally connected to a supporting member 85 which is resiliently fixed to the lower end of the piston rod 14 of a hydraulic cylinder 13 mounted at the side of a rail 4 opposite the cylinder 13 supporting the associated detector. The supporting member 85 includes a bottom portion 86 the lower surface 87 of which is flat to make close contact with the top of the tie 5, and the upper surface 88 of which is cylindrically curved to fit closely with the cylindrical bottom surface 82 of the holder member 81. Bottom portion 86 also includes a slot 89 to permit the gamma rays to pass into the tie. By this construction, air gaps, and inaccuracies due to scattering of gamma rays through air, are held to a minimum. The angles at which the incident gamma rays penetrate the tie may be adjusted by means of a link member 91 pivotally connected between the side of the holder 81 and the end of a lever 92 which is pivotally mounted on a projecting portion 93 of the supporting member 85. The lever has a handle 94 by means of which the angular position of the holder member 81 and the radiation source 38 may be adjusted; preferably, the handle 94 is capable of being twisted to clamp the lever 92 against the adjacent projecting portion 93 of the supporting member 85 to lock the holder in the desired angular position. Preferably, the portion 93 takes the form of a dial with measuring indicia which indicate the angular position of the holder member and hence the angle at which the incident gamma rays enter the tie 5. The detector 42, which preferably is like that previously described, is connected to an amplifier, pulse height analyzer and indicator, as described in connection with FIGURE 5, to provide readings on the indicator showing the count rate of gamma radiation scattered from the interior of the portion of the tie 5 below the rail 4, thus indicating the soundness of this portion of the tie.

It will be apparent that with each of the described embodiments of the invention, it is possible to determine the soundness of the portions of each tie in the vicinity of the rail where the possibilities of decay are the greatest. This determination may be made rapidly and accurately on each tie in sequence, as the vehicle embodying the inspection equipment moves along the rails. Each tie which is defective may be marked, either manually or automatically by marking means activated by the inspection equipment, for replacement. Those ties which are so unsound as to require replacement will be detected for replacement, while the sound and serviceable ties will be detected for retention. Ties which are unserviceable may thus be detected and replaced in advance of usual replacement schedules. The invention also makes possible accurate determination of the soundness of the tie including its interior, from the top surface only without removal of or damage to the tie, at relatively high speed and low costs per tie; in these respects it is much more superior to the slow, costly conventional practices of visual inspection and sounding which moreover, do not give a true indication of the condition of the interior structure of the ties.

For these reasons the invention makes possible extremely large savings in the great amounts required to be spent in conventional tie inspection and replacement practices, while making possible a track system having, in the aggregate, sounder ties.

While the invention has been disclosed in connection with gamma ray inspection of the portions of ties in the vicinity of the rails, it is apparent that other portions of the ties may be inspected by suitable location or addition of the radiation sources and detectors. Furthermore, while the radiation sources are lowered on and raised from the top of each tie, they may be located in other manners in inspection relation to each tie as the vehicle moves along the track.

Those skilled in the art will appreciate that these and other changes and modifications may be made in the invention without departing from the spirit thereof. The essential characteristics of the invention are set forth in the appended claims.

I claim:

1. Apparatus for testing wood ties embodied in a railroad track to determine the soundness of their internal structure, comprising a vehicle adapted to travel along said track, radiation source means carried by said vehicle and adapted to emit incident gamma radiation of energy less than about 1.02 m.e.v. into each tie being tested, detector means for detecting gamma radiation scattered from the interior of the tie being tested and for transmitting electrical pulses originating from such radiation, said radiation source means and said detector means being positioned relatively to each other and to the tie being tested so that said detector means detects scattered gamma radiation in the angular range between the direction of incident radiation and about 30° to the direction of incident radiation, means for selecting for counting substantially only those pulses that originate from gamma radiation scattered in said angular range and for transmitting electrical signals corresponding to said pulses, and indicator means actuated by said signals for indicating the soundness of the tie structure.

2. The apparatus of claim 1 in which said radiation source means emits incident gamma radiation equivalent to that emitted by substantially 150 to 250 microcuries of cesium 137.

3. Apparatus for testing wood ties embodied in a railroad track to determine the soundness of their internal structure, comprising a vehicle adapted to travel along said track, radiation source means carried by said vehicle and adapted to emit incident gamma radiation of energy less than about 1.02 m.e.v. into each tie being tested, detector means for detecting gamma radiation scattered from the interior of the tie being tested and for transmitting electrical pulses originating from such radiation, said radiation source means and said detector means being positioned relatively to each other and the tie being tested so that said detector means detects back-scattered gamma radiation between the direction of incident radiation and about 30° to the direction of incident radiation, means for selecting for counting substantially only those pulses that originate from gamma radiation back-scattered in said angular range and for transmitting electrical signals corresponding to said pulses, and indicator means actuated by said signals for indicating the soundness of the tie structure.

4. The apparatus of claim 3 in which said radiation source means emits incident gamma radiation equivalent to that emitted by substantially 150 to 250 microcuries of cesium 137.

5. Apparatus for testing wood ties embodied in a railroad track to determine the soundness of their internal structure, comprising a vehicle adapted to travel along said track, radiation source means carried by said vehicle and adapted to emit incident gamma radiation of energy less than about 1.02 m.e.v. into each tie being tested, detector means for detecting gamma radiation scattered from the interior of the tie being tested and for transmitting electrical pulses originating from such radiation, said radiation source means and said detector means being positioned relatively to each other and to the tie being tested so that the said detector means detects forward-scattered gamma radiation in the angular range between the direction of incident radiation and about 30° to the direction of incident radiation, means for selecting for counting substantially only those pulses that originate from gamma radiation forward-scattered in said angular range and for transmitting electrical signal corresponding to said pulses, and indicator means actuated by said signals for indicating the soundness of the tie structure.

6. The apparatus of claim 5 in which said radiation source means emits incident gamma radiation equivalent to that emitted by substantially 150 to 250 microcuries of cesium 137.

7. Apparatus for testing wood ties embodied in a railroad track below spaced rails to determine the soundness of the internal structure of the ties, comprising a vehicle adapted to travel along the track, radiation source means carried by said vehicle for emitting incident gamma radiation of energy less than about 1.02 m.e.v. into each tie being tested adjacent in close proximity to each rail of the track, detector means carried by said vehicle for detecting gamma radiation scattered from the interior of the tie in close proximity to the rails of the track and for transmitting electrical pulses arising from such radiation, said radiation sources means and said detector means being arranged relatively to each other and to the tie being tested so that said detector means detects scattered gamma radiation in the angular range between the direction of incident radiation and about 30° to the direction of incident radiation, means for selecting for counting substantially only those pulses that originate from gamma radiation scattered in said angular range and for transmitting electrical signals corresponding to said pulses, and indicator means actuated by said signals for indicating the soundness of the tie structure.

8. The apparatus of claim 7 in which said radiation source means and said detector means are positioned relatively to each other and to the tie being tested so that the radiation detected by said detector means is back-scattered radiation.

9. The apparatus of claim 7 in which said radiation source means and said detector means are positioned relatively to each other and to the tie being tested so that the radiation detected by said detector means is forward-scattered radiation.

10. The apparatus of claim 7 in which said radiation source means is located on one side of a rail and said detector means for detecting scattered gamma radiation resulting from radiation emitted by said radiation source means is located on the opposite side of said rail.

11. Apparatus for analyzing the structural characteristics of a body permeable to gamma radiation, comprising radiation source means for emitting incident gamma radiation of energy less than about 1.02 m.e.v., said source means being disposed outside of said body to emit gamma radiation into said body, gamma radiation detector means disposed outside of said body for detecting gamma radiation scattered from the interior of said body and for transmitting electrical pulses originating from such radiation, said radiation source means and said detector means being positioned relatively to each other and to said body so that said detector means detects scattered gamma radiation in the angular range between the direction of incident radiation and about 30° to the direction of incident radiation, means for selecting for counting substantially only those pulses that originate from gamma radiation scattered in said angular range and for transmitting electrical signals corresponding to said pulses, and indicator means actuated by said signals to indicate the structural characteristics of said body.

12. The apparatus of claim 11 in which said radiation source means emits gamma radiation equivalent to that emitted by substantially 150 to 250 microcuries of cesium 137.

13. Apparatus for analyzing structural characteristics of a body permeable to gamma radiation, comprising radiation source means for emitting incident gamma radiation of energy less than about 1.02 m.e.v., said source means being disposed outside of said body to emit incident gamma radiation into said body, gamma radiation detector means means disposed outside of said body for detecting gamma radiation scattered from the interior of said body and for transmitting electrical pulses originating from such radiation, said radiation source means and said detector means being positioned relatively to each other and to said body so that said detector means detects back-scattered gamma radiation in the angular range between the direction of incident radiation and about 30° to the direction of incident radiation, means for selecting for counting substantially only those pulses that originate from gamma radiation back-scattered in said angular range and for transmitting electrical signals corresponding to said pulses, and indicator means actuated by said signals to indicate the structural characteristics of said body.

14. The apparatus of claim 13 in which said radiation source means emits incident gamma radiation equivalent to that emitted by substantially 150 to 250 microcuries of cesium 137.

15. Apparatus for analyzing structural characteristics of a body permeable to gamma radiation comprising radiation source means for emitting incident gamma radiation of energy less than about 1.02 m.e.v., said source means being disposed outside of said body to emit gamma radiation into said body, gamma radiation detector means disposed outside of said body for detecting gamma radiation scattered from the interior of said body and for transmitting electrical pulses originating from such radiation, said radiation source means and said detector means being positioned relatively to each other and to said body so that said detector means detects forward-scattered gamma radiation in the angular range between the direction of incident radiation and about 30° to the direction of incident radiation, means for selecting for counting substantially only those pulses that originate from gamma radiation forward-scattered in said angular range and for transmitting electrical signals corresponding to said pulses, and indicator means actuated by said signals to indicate the structural characteristics of said body.

16. The apparatus of claim 15 in which said radiation source means emits incident gamma radiation equivalent to that emitted by substantially 150 to 250 microcuries of cesium 137.

17. The apparatus of claim 1 comprising means for lowering said radiation source means and said detector means into close proximity with each of several ties of the railroad track as said vehicle travels, and for raising said radiation source means and said detector means to elevated positions when they are between the ties.

References Cited by the Examiner

UNITED STATES PATENTS

| | | | |
|---|---|---|---|
| 2,304,910 | 12/42 | Hare | 250—43.5 |
| 2,675,482 | 4/54 | Brunton | 250—83.4 |
| 2,781,453 | 2/57 | Belcher et al. | 250—83.6 |
| 2,900,596 | 8/59 | Drake | 324—37 |
| 2,975,281 | 3/61 | Williams | 250—83.4 X |

FOREIGN PATENTS 1,064,725 9/59 Germany.

RALPH G. NILSON, *Primary Examiner.*

ARCHIE R. BORCHELT, *Examiner.*

UNITED STATES PATENT OFFICE
CERTIFICATE OF CORRECTION

Patent No. 3,176,134                              March 30, 1965

James J. Wright

It is hereby certified that error appears in the above numbered patent requiring correction and that the said Letters Patent should read as corrected below.

In the heading of each of the six sheets of drawings and in the heading to the printed specification, title of invention, for "GAMMA DENSITOMETER FOR TESTING RAILROAD TIES", each occurrence, read -- GAMMA DENSIMETER FOR TESTING RAILROAD TIES --.

Signed and sealed this 31st day of May 1966.

(SEAL)
Attest:

ERNEST W. SWIDER                          EDWARD J. BRENNER
Attesting Officer                                 Commissioner of Patents